(12) United States Patent
Püttmer

(10) Patent No.: US 7,703,326 B2
(45) Date of Patent: Apr. 27, 2010

(54) METHOD AND SYSTEM FOR DIAGNOSING MECHANICAL, ELECTROMECHANICAL OR FLUIDIC COMPONENTS

(75) Inventor: Alf Püttmer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 350 days.

(21) Appl. No.: 11/919,855

(22) PCT Filed: May 2, 2006

(86) PCT No.: PCT/EP2006/061984

§ 371 (c)(1),
(2), (4) Date: Nov. 2, 2007

(87) PCT Pub. No.: WO2006/117375

PCT Pub. Date: Nov. 9, 2006

(65) Prior Publication Data

US 2009/0090185 A1    Apr. 9, 2009

(30) Foreign Application Priority Data

May 4, 2006 (DE) ................. 10 2005 020 900

(51) Int. Cl.
*G01H 1/14* (2006.01)
*G01H 1/12* (2006.01)
*G01H 1/16* (2006.01)

(52) U.S. Cl. ....................................... 73/587
(58) Field of Classification Search ........... 73/587
See application file for complete search history.

(56) References Cited

U.S. PATENT DOCUMENTS

| 5,041,989 | A | * | 8/1991 | Kataoka et al. .............. 702/39 |
| 5,361,628 | A | * | 11/1994 | Marko et al. ............. 73/114.15 |
| 5,477,729 | A | | 12/1995 | Cavalloni |
| 6,234,021 | B1 | | 5/2001 | Piety et al. |
| 2001/0047691 | A1 | * | 12/2001 | Dzenis ....................... 73/587 |
| 2003/0019297 | A1 | * | 1/2003 | Fiebelkorn et al. ............ 73/587 |
| 2009/0090186 | A1 | * | 4/2009 | Linzenkirchner et al. ..... 73/587 |

FOREIGN PATENT DOCUMENTS

| DE | 299 12 847 U1 | 10/2000 |
| DE | 101 35 674 A1 | 2/2003 |
| EP | 1 216 375 B1 | 6/2002 |

* cited by examiner

*Primary Examiner*—Hezron Williams
*Assistant Examiner*—Rose M Miller

(57) ABSTRACT

There is described a diagnosis method and system including a sensor for structure-borne noise which emits a measuring signal in a bandwidth-filtered manner due to its mechanical resonant frequency, capacitance and inductance. The system also includes an evaluation device in which the measuring signal is undersampled and which outputs an error signal should the undersampled measuring signal exceed a defined threshold value. The system requires only a small number of electronic components and only a little power supply capacity. The system thereby allows diagnosis to be carried out without complication in existing devices, especially in field devices of process instrumentation for which only a limited amount of operating power is available. The method and system are especially advantageous for the recognition of valve leakage with an electropneumatic position controller.

12 Claims, 2 Drawing Sheets

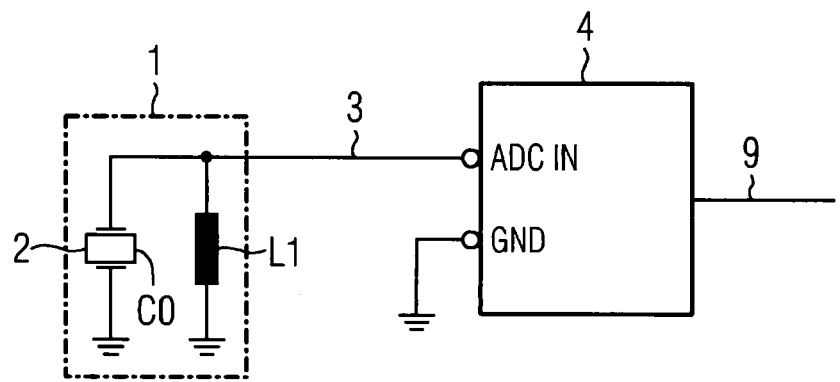
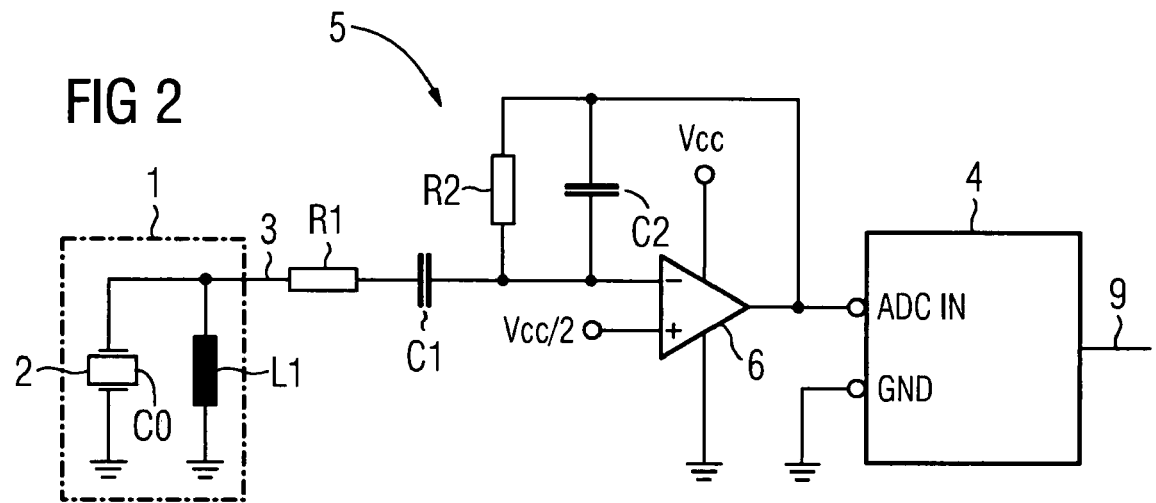

METHOD AND SYSTEM FOR DIAGNOSING MECHANICAL, ELECTROMECHANICAL OR FLUIDIC COMPONENTS

CROSS REFERENCE TO RELATED APPLICATIONS

This application is the US National Stage of International Application No. PCT/EP2006/061984, filed May 2, 2006 and claims the benefit thereof. The International Application claims the benefits of German application No. 10 2005 020 900.9 DE filed May 4, 2005, both of the applications are incorporated by reference herein in their entirety.

FIELD OF INVENTION

The invention relates in one aspect to a method for diagnosing mechanical, electromechanical or fluidic components, in particular a valve which can be actuated by a positioner via a drive, and also to a system for diagnosing such components.

BACKGROUND OF INVENTION

By analyzing structure-borne noise it is possible to identify features which assist in the detection of faults or errors in mechanical, electromechanical or fluidic components. For example, EP 1 216 375 B1 discloses a diagnostic system for a valve which can be actuated by a positioner via a drive wherein the intensity of the structure-borne noise in a spectral range above 50 kHz is used for detecting a leakage in the valve. However, the known diagnostic system requires a spectral analysis of the measurement signal and hence involves a substantial overhead in terms of electronics and computing power. It also entails an increase in the electrical power consumption of the evaluation unit. Integration of the diagnostic method as an additional function into existing devices is therefore only rarely possible, since the additional power is often unavailable. This applies in particular to field devices of automation systems, e.g. measurement transformers or final control elements. These must satisfy explosion protection requirements in many cases, or are supplied with the necessary auxiliary energy via a 4 to 20 mA interface or a PROFI-BUS connection. The diagnostic system must then be housed in an additional device at additional expense.

Patent specification U.S. Pat. No. 5,477,729 discloses a sensor for structure-borne noise, which sensor is suitable for measuring high-frequency acoustic signals up to approximately 2 MHz.

SUMMARY OF INVENTION

An object of the invention is to provide a method and a system for diagnosing mechanical, electromechanical or fluidic components, said method and system being characterized by low expense.

In order to achieve this object, the method of the type described in the introduction has the features specified in an independent claim. A system for performing the method is described in a further independent claim, and developments of the invention are described in the dependent claims.

The invention has the advantage that, in order to perform the method, significantly less switching and energy overhead is required than was previously the case. This advantage is achieved by virtue of combining and considerably simplifying the functions to be realized, e.g. by having a component perform a plurality of functions simultaneously. Thus, for example, in addition to the actual conversion of the structure-borne noise into an electrical signal, a sensor for structure-borne noise also has the simultaneous function of bandpass filtering. This is easily achieved by coordinating the mechanical resonance frequency and the capacitance of the sensor, as well as an inductance, with one another in a suitable manner. This means that the sensor for structure-borne noise already generates a measurement signal which predominantly includes signal components in the relevant frequency range for the application concerned. Further filter elements are therefore not essential. For the purpose of further processing, an undersampling of the measurement signal is carried out. Within the context of the analysis for identifying features, this results in a minimization of the required computing power. The undersampling also causes a reduction in the speed requirements placed on the analog-to-digital conversion. Undersampling means that the measurement signal is captured at a lower sampling rate for digital post-processing than would be required according to the known Nyquist-Shannon sampling theorem for analysis of the frequency components of interest in the measurement signal. In order to minimize the computing power, undersampling is preferably performed at a sampling rate that is orders of magnitude lower than that. This measure is based on the knowledge that owing to the bandpass filtering the noise intensity in the frequency range of interest can equally well be determined with a strong undersampling and that therefore a complicated and resource-intensive Fast-Fourier transform for the purpose of analyzing and examining the frequency range of interest can be dispensed with. Since only signal components in the frequency range of interest are now still present in the bandpass-filtered measurement signal, the intensity determined by means of undersampling corresponds to that of the measurement signal in the frequency range of interest.

The intensity of the undersampled measurement signal is now compared in a simple manner with a threshold value in order to obtain an indication as to whether or not an error status is present in respect of the mechanical, electromechanical or fluidic component. Said threshold value can be predetermined for example by means of manual input or by means of a prior measurement and analysis performed in a good status.

As a result of the small number of electronic components that are required, as well as the small amount of computing power and electrical power that is required, it is now possible for the diagnosis comprising structure-borne noise measurement and signal analysis to be integrated in existing devices such as e.g. sensors or actuators of the process instrumentation, in particular in a regulating valve which can be actuated by a positioner via a drive. This integration is particularly simple if the device already includes a microcontroller which can easily handle the calculations required for analyzing the measurement signal in addition to its existing tasks. The novel diagnostic method and system are therefore characterized by a particularly low overhead in terms of the extra resources that are required in order to carry out the diagnosis.

A particularly low computing overhead, and associated therewith a particularly small energy requirement of the microcontroller performing the calculations, is achieved if the moving average from the amounts of the individual sample values is determined as the characteristic quantity for the intensity of the undersampled measurement signal and compared with the predetermined threshold value.

Prior to the undersampling, a signal amplification of the signal which is generated by the sensor for structure-borne noise can be performed by means of an additional bandpass filtering in an electronic circuit comprising only one operational amplifier. This has the advantage of allowing a better selection of the signal components in the frequency range of interest, without at the same time having to significantly increase the energy requirement for the diagnosis. The optional operational amplifier is used both for signal amplification and, by virtue of its circuitry configuration, for bandpass filtering. The number of additional electronic components is therefore reduced to a minimum. In an improved manner the bandpass filtering only leaves those signal components remaining which relate to the phenomenon requiring to be detected.

The novel diagnostic method and system can be applied particularly advantageously to the detection of leaks in regulating valves, since a measurement signal frequency range above 50 kHz is of interest for this and expresses the strength of the cavitation noise. Reference is made to EP 1 216 375 B1 as already cited in the introduction above for a more detailed explanation of an arrangement for valve diagnosis by means of structure-borne noise analysis and the associated advantages.

BRIEF DESCRIPTION OF THE DRAWINGS

The invention and embodiments and advantages are explained in greater detail below with reference to the drawings, which illustrate an exemplary embodiment of the invention and in which:

FIG. 1 shows a block schematic diagram of a diagnostic system,

FIG. 2 shows a diagnostic system including optional active bandpass filter.

DETAILED DESCRIPTION OF INVENTION

Figure 3:
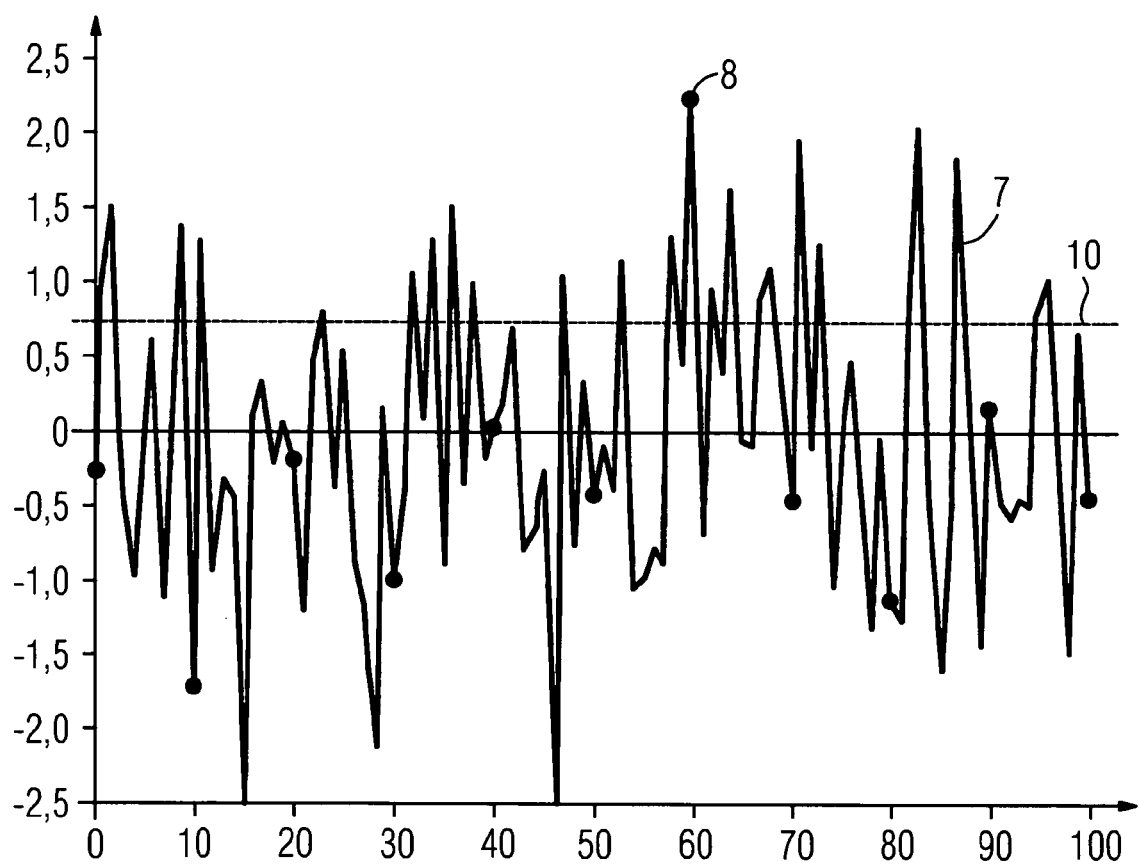
FIG. 3 shows a time diagram of a bandpass-filtered measurement signal.

Referring to FIG. 1, a sensor 1 for structure-borne noise has a piezoceramic element 2 which is provided with electrodes. In the electrical equivalent circuit diagram, the piezoceramic element 2 has a capacitance C0 which can be modified by means of additional capacitors if necessary. An inductance L1 is connected in parallel with the piezoceramic element 2 and integrated in the sensor 1 as indicated by broken lines in FIG. 1. Alternatively, the inductance can be realized as a separate component. In order for the sensor 1 to emit a measurement signal 3 which essentially contains only signal components in a frequency range of interest, the mechanical resonance frequency of the piezoceramic element 2, the capacitance C0 and the inductance L1 are coordinated with one another in a suitable manner. The measurement signal 3 is applied to an analog input ADC IN of a microcontroller 4. The microcontroller 4 forms an analysis unit in which undersampling of the measurement signal 3 is performed and an error reporting signal 9 is generated if the intensity of the undersampled measurement signal 3 exceeds a predetermined threshold value. The intensity is determined by calculation of a simple characteristic value K which corresponds to an average value of the amounts of the sample values. The associated formula is as follows:

$$K = \frac{1}{N}\sum_{i=1}^{N} |x_i|,$$

where

N—Number of summed sample values

I=1 ... N—continuous index of the summation and $X_i$—i-th sample value, where i=1 corresponds to the last sample value, i=2 to the next-to-last sample value, etc.

The diagnostic system according to FIG. 1 is integrated in an electropneumatic positioner for a valve which can be actuated via a pneumatic drive. The microcontroller 4 is the microcontroller which is already present in the positioner anyway. It becomes particularly clear here that the novel diagnostic system can be added to an existing positioner at very little expense. In principle, only the sensor 1 for structure-borne noise and an analog input of the microcontroller 4 are required. The changes that are required to the program of the microcontroller 4 in order to perform the diagnostic method are comparatively small-scale due to the simple calculations. The calculations demand only a small part of the available computing power of the microcontroller 4.

The amplification of the measurement signal 3 is accomplished by utilizing the resonance ratio of the oscillatory circuit which is formed by the capacitance C0 of the piezoceramic element and the inductance L1.

FIG. 2 shows a diagnostic system which is expanded by an optional amplifier circuit 5. The circuit parts already explained above with reference to FIG. 1 are identified by the same reference symbols in FIG. 2. The additional amplifier circuit 5 essentially consists of an operational amplifier 6 whose supply terminals are connected to a positive supply voltage VCC and to ground respectively. The half supply voltage VCC/2 is applied to the reference input of the operational amplifier 6. A series connection comprising a resistor R1 and a capacitor C1 is arranged in the input path of the operational amplifier 6. A parallel connection comprising a resistor R2 and a capacitor C2 is disposed in the feedback path. When correctly tuned, this circuit of the operational amplifier 6 provides a simple means of achieving a bandpass effect which amplifies precisely the signal components in the frequency range of interest. The optional operational amplifier 6 is therefore used both for amplifying the measurement signal 3 and, by virtue of its circuitry configuration, for bandpass filtering. The number of electronic components is therefore reduced to a minimum.

In the described application of the diagnostic system for detecting a valve leakage, the sensor 1 for structure-borne noise and the electronic circuit 5 are specifically optimized for high sensitivity in respect of flow-related noises at the same time as insensitivity in respect of the working noises of pumps or similar adjacent components. The sensor 1 is permanently mounted on a prepared smooth surface on the exterior of the valve housing by means of a screw. A reliable acoustic coupling is provided by a heat-resistant jointing grease between valve housing and sensor. Alternatively, attachment to the housing of the positioner is possible in the case of good acoustic coupling. No additional sensor technology is required in addition to the sensor 1 for structure-borne noise. The analysis can be adapted automatically to changing load conditions such as pressure and stroke count, without any parameters having to be set or a calibration relative to a good status being required. The alarm thresholds can also be specified manually by a user.

FIG. 3 serves to illustrate the principle of undersampling which leads to a substantial reduction in the power requirement associated with the analysis. The figure shows a profile 7 of the bandpass-filtered measurement signal comprising 100 sample values which were obtained using a sampling rate that is adapted in the usual manner to the frequency range of interest. The number of the sample value (sample) is plotted on the X-axis and its amplitude on the Y-axis. In undersampling at a sampling rate that is an order of magnitude lower, every tenth sample value is included in the further processing.

The sample values of the undersampling that are taken into account therein are marked by means of dots in the profile 7 of the measurement signal, e.g. the sample value 8. The calculated average value which is compared with a predetermined threshold value is depicted as a horizontal line 10 in FIG. 3. It becomes clear that a similar characteristic value is calculated as the average value in a moving averaging of the amounts of the sample values irrespective of whether undersampling is performed or not. An important prerequisite for this effect is that the signal components of the measurement signal are limited by bandpass filtering on the frequency range of interest. It is therefore possible to dispense with a complicated and resource-intensive Fast-Fourier analysis for examining the frequency range of interest. This results in a significant reduction in the computing overhead required to perform the diagnostic method, and hence in a reduction in the power requirement, with the benefit that the novel diagnostic method can also be used in the case of field devices having access to only a limited amount of auxiliary energy for their operation.

The invention claimed is:

1. A method for diagnosing a component, comprising:
   providing a sensor for a structure-borne noise, wherein the sensor is comparatively insensitive in the range of low-frequency working noises and sensitive in a higher-frequency range of error noises;
   generating a measurement signal by the sensor, wherein a mechanical resonance frequency, a capacitance and an inductance of the sensor for structure-borne noise are coordinated with one another in such a way that the sensor generates the measurement signal which predominantly includes signal components in the relevant frequency range for the application concerned;
   providing a unit for analyzing the received measurement signal;
   performing an undersampling the measurement signal in the unit; and
   generating an error reporting signal if the intensity of the undersampled measurement signal exceeds a predetermined threshold value.

2. The method as claimed in claim 1, wherein the component is selected from the group consisting of a mechanical component, a electromechanical component and a fluidic component.

3. The method as claimed in claim 1, wherein the component has a valve, wherein the valve is actuated by a positioner.

4. The method as claimed in claim 3, wherein the valve is actuated by the positioner via a drive.

5. The method as claimed in claim 1, wherein a moving average from the amounts of individual sample values is determined as a characteristic quantity for the intensity of the measurement signal.

6. The method as claimed in claim 1, wherein a signal amplification is performed with additional bandpass filtering in an electronic circuit having only one operational amplifier prior to the undersampling.

7. The method as claimed in claim 5, wherein a signal amplification is performed with additional bandpass filtering in an electronic circuit having only one operational amplifier prior to the undersampling.

8. A system for diagnosing component with a valve, a positioner to actuate the valve via a drive, comprising:
   a sensor for structure-borne noise, wherein the sensor is insensitive in the range of low-frequency working noises and sensitive in the higher-frequency range of error noises;
   a unit for analyzing a received measurement signal, wherein the unit provides an undersampling of the measurement signal, and wherein the unit generates an error reporting signal if the intensity of the undersampled measurement signal exceeds a predetermined threshold value; and
   a capacitance of the sensor, an inductance of the sensor and a mechanical resonance frequency, wherein the capacitance, the inductance and the mechanical resonance frequency are coordinated with one another in such a way that the sensor generates a measurement signal which predominantly includes signal components in the relevant frequency range for the application concerned.

9. The system as claimed in claim 8, wherein the valve is a tank venting valve of a motor vehicle.

10. The system as claimed in claim 9, wherein a moving average from the amounts of individual sample values is determined as a characteristic quantity for the intensity of the measurement signal.

11. The system as claimed in claim 9, wherein a signal amplification is performed with additional bandpass filtering in an electronic, circuit having only one operational amplifier prior to the undersampling.

12. The system as claimed in claim 10, wherein a signal amplification is performed with additional bandpass filtering in an electronic circuit having only one operational amplifier prior to the undersampling.

* * * * *